UNITED STATES PATENT OFFICE.

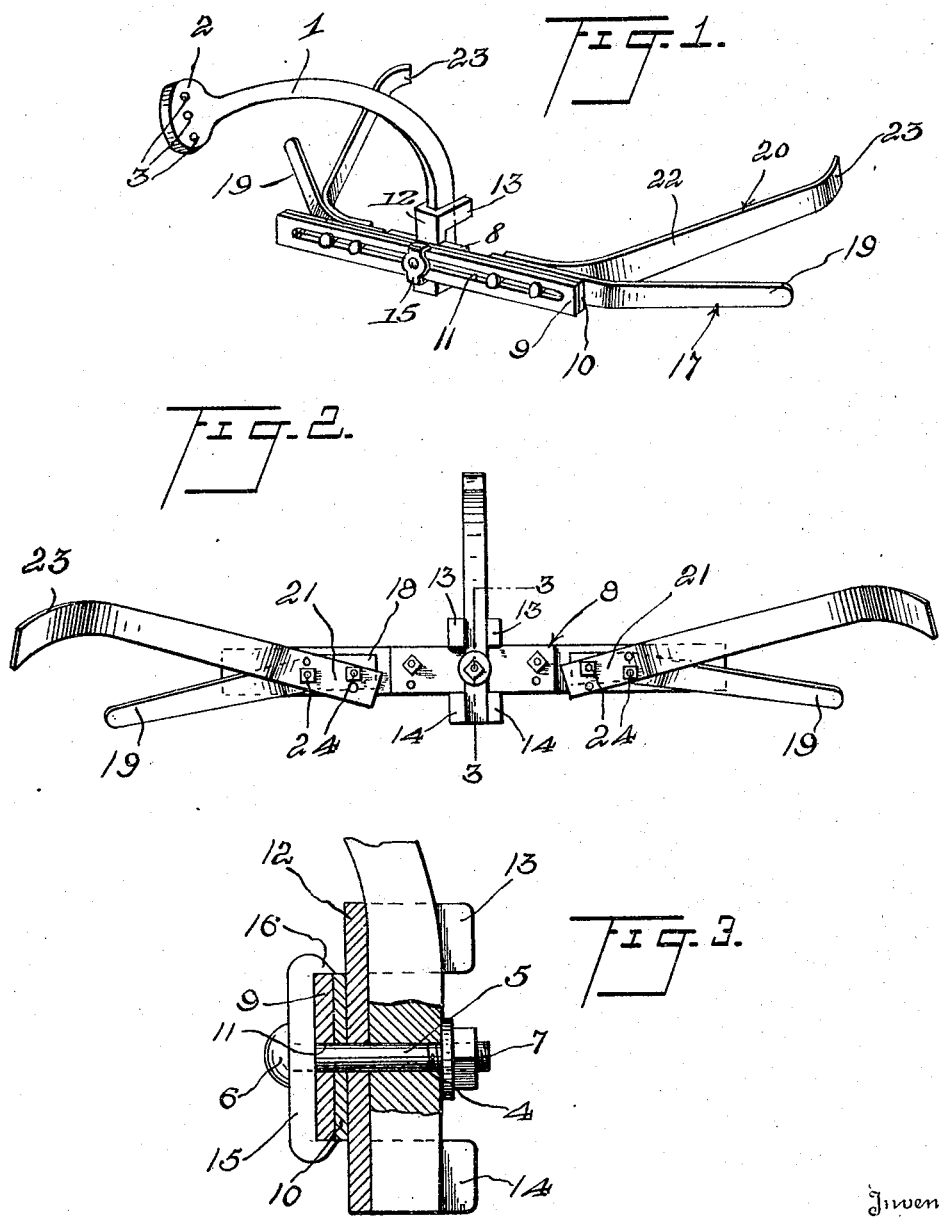

THEODORE D. TERRY, OF JAMESPORT, NEW YORK.

ATTACHMENT FOR CULTIVATORS.

1,191,850.  Specification of Letters Patent.  Patented July 18, 1916.

Application filed January 6, 1915. Serial No. 835.

*To all whom it may concern:*

Be it known that I, THEODORE D. TERRY, a citizen of the United States, residing at Jamesport, in the county of Suffolk and State of New York, have invented certain new and useful Improvements in Attachments for Cultivators; and I do hereby declare the following to be a full, clear, and exact description of the invention, such as will enable others skilled in the art to which it appertains to make and use the same.

This invention relates to new and useful improvements in attachments for cultivators, and has for its principal object to provide a device which may be easily and quickly secured to the rear shank of a cultivator in place of the usual tooth which is commonly used upon all cultivators.

Another object of the invention is to provide a depth gage which will prevent the cultivator teeth from digging too deeply into the earth.

A further object of the invention is to provide a device of the above character which will not only serve as a depth gage but which will also cause the earth in the furrow to be thrown up on each side so as to hill the same around the plants which are being cultivated.

Still another object of the invention is to provide a device which may be quickly adjusted to various widths of rows without undue inconvenience to the user.

Still another object of the invention is to provide a novel means for supporting the device on the rear arm.

A still further object of the invention is to provide a cultivator attachment which will take the place of a horizontal bar ordinarily used in the rear of a cultivator.

With these and other objects in view, the invention consists in the novel combination and arrangement of parts which will be fully set forth in the following specification and accompanying drawings, in which—

Figure 1 is a perspective view of a cultivator attachment constructed in accordance with this invention, showing the same as it would appear when applied to the arm, Fig. 2 is a rear view in elevation of the device, and Fig. 3 is an enlarged vertical sectional view taken on line 3—3 of Fig. 2, and showing the cultivator arm and the clip in full lines.

Referring now to the drawings by characters of reference, the numeral 1 designates the standard of the usual construction provided at its forward end with the ordinary enlargement 2 having formed therein a series of apertures 3 which are designed for adjusting the standard. This standard is essentially arcuate and provided near its end opposite the enlargement 2 with a suitable aperture 4 through which the bolt 5 provided with the ordinary head 6 and threads 7, extends. This bolt 5 may be used to secure the ordinary tooth in place, and is also designed to be used in connection with the cultivator attachment designated generally by the numeral 8. This cultivator attachment 8 comprises bars 9 and 10, which bars are provided with the longitudinally extending alining slots 11 which are designed to permit of adjustment of the gaging and hilling members which will be more fully hereinafter described.

Secured to the bars 9 and 10 intermediate their ends is the plate 12 which plate is formed at its upper end with the rearwardly extending arms 13 and at its lower edge with the rearwardly extending arms 14 which are spaced from each other a sufficient width to receive the lower end of the standard 1. A suitable clip 15 having the inwardly turned ends 16 formed thereon is designed to overlie a portion of the outer face of the bar 9 and this clip is provided with a central aperture for the reception of the shank of the bolt 5, as clearly shown in Fig. 3.

The gaging and hilling elements hereinbefore referred to are best shown in Fig. 1, and the gaging elements comprise the strips or bars of metal 17 which comprise the body 18 having formed thereon the angular vent extensions 19 which are designed so that their lower edge extends forwardly to form a shovel to cause the earth with which they come in contact to be pushed outwardly and upwardly.

The shovel elements, designated generally by the numeral 20, comprise the bodies 21 which are provided with the upwardly and rearwardly extending portions 22 which terminate at their rearmost ends in the rearward extensions 23 which extend substantially parallel to each other and are bent inwardly to avoid injury to the plant should they come in contact therewith. The gage and shovel elements 17 and 20 respectively are held in adjusted position on the bars 9 and 10 by means of the bolts 24 which bolts are designed to extend through the slots 11 and through suitable apertures formed in the elements 17 and 20 in order that the elements may be adjusted laterally with relation to the bars in order that the device may be used to cultivate fields and the like wherein the rows are spaced differently.

It will be apparent from the foregoing that in use the bolt 5 is loosened and the cultivator shovel removed from the rear arm 1 of the cultivator. After the shovel has been disposed of, the bars 9 and 10 are then placed in position so that the arms 13 and 14 of the plate 12 extend over the side faces of the lower end of the standard. The bolt 5 is then passed through the aperture in the clip 15 and through the slots 11 and the aperture 4, whereupon the user turns the nut on the bolt and tightens the hoe in place. The bolts 24 are then loosened and the gage and shovel elements 17 and 20 are slid longitudinally of the bars 9 and 10 until the desired position is reached whereupon the bolts are tightened and the device is ready for use. It will be apparent that in use the bars 9 and 10 and the gage elements 17 will prevent the cultivator from digging too deeply into the ground, while the gage member 17 will cause the loose earth to ride upwardly and outwardly until it is gaged by the shovel members 20 which will cause the same to hill around the plant upon which the device is used, and it will thus be seen that the plant will get the benefit of the loose earth which will materially assist in retaining the moisture around the roots of the plants.

While in the foregoing there has been shown and described the preferred embodiment of this invention, it is to be understood that such changes may be made in the combination and arrangement of parts as will fall within the spirit and scope of the appended claims.

What is claimed is:—

1. An attachment for cultivators of the character described comprising supporting bars arranged to be secured to the rear standard of a cultivator, and an outwardly extending gage and shovel elements secured to the supporting bars to cause the earth to be banked around the roots of the plants that are being cultivated.

2. A cultivator attachment of the character described comprising supporting bars, means to attach the bars to the rear standard of a cultivator, said bars being provided with a longitudinal slot, outwardly extending gage and shovel elements adjustably secured to the bars, bolts extending through the slot and adapted to hold the gage and shovel elements in adjusted position on the bars, and means to removably secure the whole to the rear standard of the cultivator.

3. A cultivator attachment of the character described comprising horizontal supporting bars, a plate secured to the supporting bar, rearward extensions formed at the upper and lower terminals of the plate, said extensions being parallel and being designed to engage the lateral faces of the rear cultivator standard upon which the device is used, laterally extending gage and shovel elements adjustably secured to the horizontal supporting bars, and means coöperating with the parallel extensions on the plate to support the whole on the rear standard of a cultivator.

In testimony whereof I affix my signature in presence of two witnesses.

THEODORE D. TERRY.

Witnesses:
JOHN JANISZCZAK,
FRANK JANISZCAK.

Copies of this patent may be obtained for five cents each, by addressing the "Commissioner of Patents, Washington, D. C."